United States Patent
Genest et al.

(10) Patent No.: US 6,606,308 B1
(45) Date of Patent: Aug. 12, 2003

(54) METHOD OF TRANSMITTING IN SUCCESSIVE TIME SLOTS

(75) Inventors: Pierre Genest, Butry sur Oise (FR); Arnaud Parisel, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/353,027

(22) Filed: Jul. 13, 1999

(30) Foreign Application Priority Data

Jul. 16, 1998 (FR) .............................. 98 09102

(51) Int. Cl.[7] ....................... H04B 7/185; H04B 7/212; H01Q 11/12
(52) U.S. Cl. ........................ 370/318; 370/321; 455/127
(58) Field of Search ................. 370/318, 317, 370/321, 323, 337; 455/127

(56) References Cited

U.S. PATENT DOCUMENTS

| | | | | |
|---|---|---|---|---|
| 5,150,075 A | * | 9/1992 | Hietala et al. .............. 330/279 |
| 5,675,611 A | * | 10/1997 | Lehtinen et al. ............ 330/135 |
| 5,809,017 A | * | 9/1998 | Smith et al. ................ 370/318 |
| 6,049,540 A | * | 4/2000 | Chrin et al. ................ 370/357 |
| 6,169,886 B1 | * | 1/2001 | Black et al. ................ 455/126 |
| 6,173,016 B1 | * | 1/2001 | Suzuki ....................... 375/295 |

FOREIGN PATENT DOCUMENTS

| | | |
|---|---|---|
| EP | 0 599 665 A2 | 6/1994 |
| WO | WO 97/23062 | 6/1997 |

* cited by examiner

Primary Examiner—Lee Nguyen
Assistant Examiner—Yuwen Pan
(74) Attorney, Agent, or Firm—Sughrue Mion, PLLC

(57) ABSTRACT

Problems of noise emission during transmission in successive time slots (A–B) in mobile telephony are solved by causing the transmitted power to change in a monotonic manner from a previous value to a new value. It is shown that this increases the transmission bit rate.

6 Claims, 1 Drawing Sheet

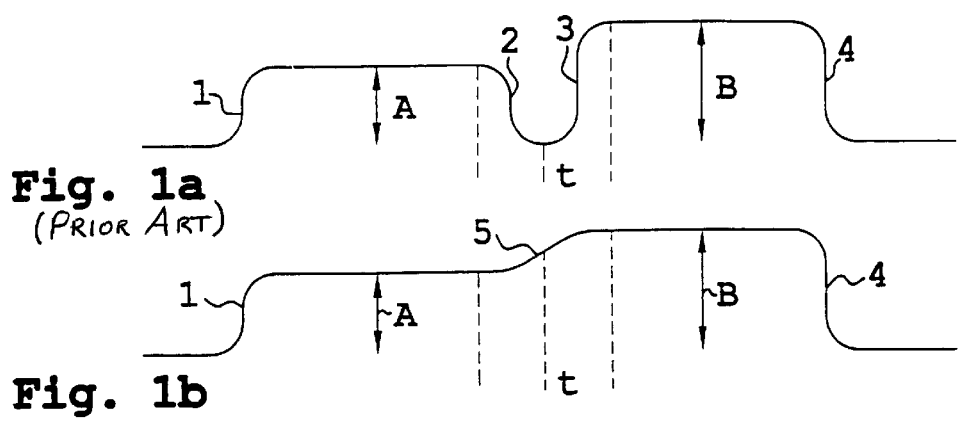
Fig. 1a (PRIOR ART)
Fig. 1b
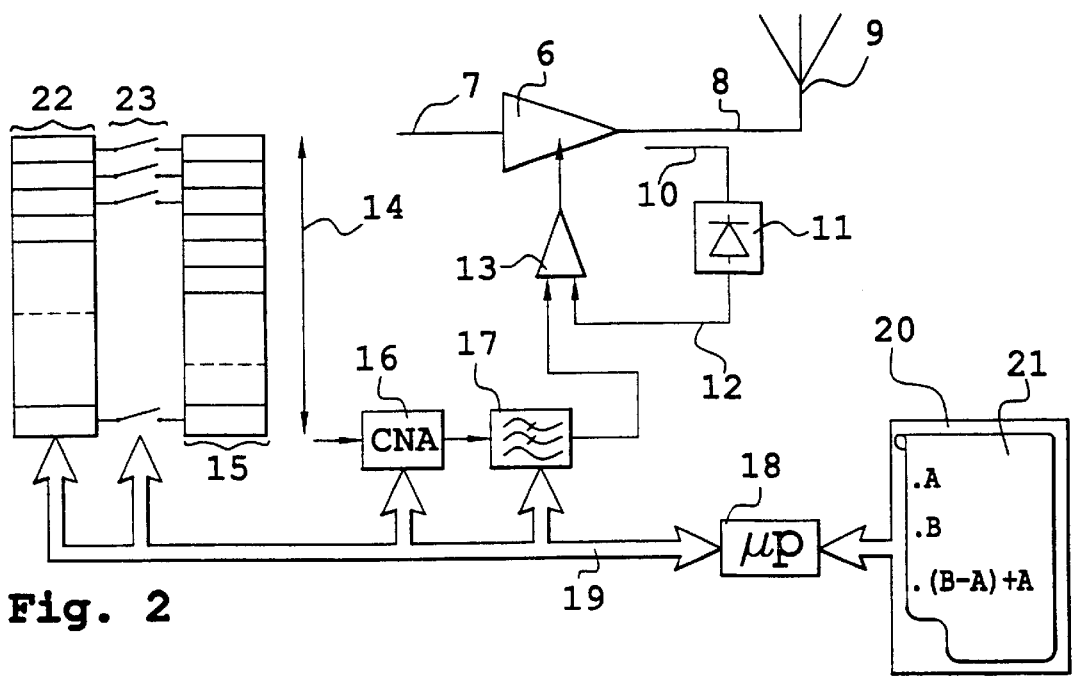
Fig. 2
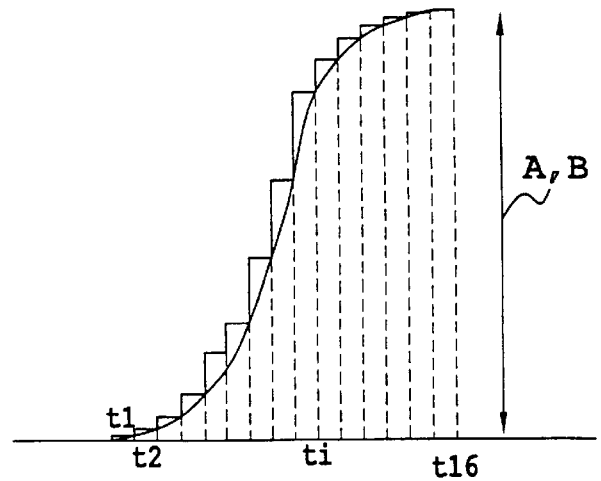
Fig. 3

METHOD OF TRANSMITTING IN SUCCESSIVE TIME SLOTS

The present invention concerns a method of transmitting in successive time slots within a transmission frame, in particular a Time-Division Multiple Access (TDMA) frame, in a radio communication system. The invention relates in particular to the field of time-division multiple access (as opposed to frequency-division multiple access (FDMA) or code-division multiple access (CDMA)) mobile telephony. Of course, it also concerns hybrid systems involving at least time-division multiple access. It is equally applicable to transmission by base stations and to transmission by mobile telephones. It is aimed principally at the field of high bit rate transmission.

BACKGROUND OF THE INVENTION

The time-division of different communication channels in successive time slots within a common frame is known in itself in the field of radio communications. A frame, for example a Global System for Mobile communications (GSM) frame, conventionally includes eight time slots (TS0 through TS7). A communication channel between a first mobile telephone and a base station is normally assigned a first time slot in a plurality of successive frames. Each transmission channel is also related to a carrier frequency that can be used during the aforementioned time slot. However, the carrier frequency for the same time slot can change from one frame to the next, and therefore for the same transmission channel (the same call between the mobile telephone and the base station), because of an evolving frequency hopping scheme.

As a result of this approach, a carrier frequency could be used by a channel allocated to a first mobile telephone during one time slot and the same carrier frequency could be used by another channel allocated to a second mobile telephone during the next time slot in the same frame. The other channel could be used for a call between the second mobile telephone and the base station covering the geographical area in which the first mobile telephone is located, for example. The second mobile telephone could nevertheless be communicating with another base station.

To prevent signal tail ends resulting from transmission in a first channel during a preceding time slot producing noise degrading the transmission of a message during the next time slot that happens by chance to use the same carrier frequency, one recommendation requires the power of the signal transmitted during a time slot to fall off very rapidly at the end of the slot.

The noise phenomenon referred to above may not be encountered in practice because the recommendation requires that the signal transmitted during the next time slot should be attenuated to a level approximately 36 dB lower than that of the preceding time slot and that the immediately following time slot should not use the same frequency as that used for another call during a preceding time slot.

Nevertheless, the simultaneous activity of more than one operator in the same geographical area, or their freedom of choice in terms of planning of frequency hopping in accordance with the recommendations, can lead to situations in which the same bands are occupied for immediately successive time slots. This leads to tightening of the recommendations to prevent messages transmitted during one time slot generating noise in subsequent time slots.

The attenuation measurement principle to which time-division systems must therefore adhere consists in measuring, during the next time slot, a spectral component shifted (by 400 kHz in GSM, for example) relative to the carrier frequency used in the preceding time slot. This value is 400 kHz because the channels each occupy 200 kHz and the immediately adjoining band is normally not used. Of course, noise occurs at other frequencies, but in order to take all noise into account the recommendation allows the measurement to be carried out during the next time slot at a single frequency, shifted 400 kHz, to reveal the extinction of spurious transmissions and conformance of the equipment to the recommendation.

To conform to this requirement, the power transmitted by the mobile telephone or the base station must rise progressively to its nominal value at the start of each time slot. It must fall to zero at the end of the time slot. However, if they are too sudden, these changes in transmitted power themselves generate noise having a high frequency spectrum that is particularly full. Consequently, too sudden a rise or fall causes transmission of unwanted high frequency harmonics. To solve this problem, there is provision for the nominal transmitted power amplitude to rise in accordance with a progressive curve, for example a cosine curve, over a very short time period. Extinction is similar. The transmission of payload bits is neutralized when the power is rising or falling.

To conform to the recommendation if it is necessary to transmit from the same mobile telephone or the same base station during two successive time slots, in particular if it is necessary to retain transmission at a high bit rate, the nominal transmission level must return to zero in the times between successive time slots. This reduces the usable bit rate because of the neutralization it requires.

OBJECTS AND SUMMARY OF THE INVENTION

The aim of the invention is to minimize interference and therefore to conform to the recommendation, in particular when using two or even three or more successive time slots to transmit a stream of data from the same base station or the same mobile telephone, in particular in a high bit rate application. The frequency can change in successive time slots because of frequency hopping or it can remain the same if frequency planning in the area allows this.

In accordance with the invention, this problem is solved by bringing about, at the time of changing from one time slot to the next, a monotonic progressive variation in the power transmitted by the transmitter, this monotonic variation consequently being different from a fall in power at the end of a time slot followed by a rise in power at the start of the next time slot. The effect of this variation is to return directly to the nominal transmission level assigned to the next time slot during that slot.

Thus transmission in the next time slot is preferably at a higher power than during one or more preceding time slots. This has two consequences: firstly, because the transmitted power is higher, the signals transmitted during the second time slot have better physical protection against noise. Consequently, the encoding to which they are subjected can have a lower level of redundancy, which leads to the usable bit rate in the second time slot increasing compared with the usable bit rate in the first time slot. The second consequence is that a higher nominal power level can be expected in the second time slot although if it had been necessary to reach this nominal power level from zero power, the rising power slope would have been too steep and would have lead to the transmission of prohibited interference.

It can further be shown that less interference is produced and therefore that the recommendation is better complied with by the above approach, i.e. by not requiring the transmitted power to pass through zero but instead by changing via a monotonic step from the transmitted power of the first time slot to the transmitted power of the second time slot.

Consequently, the invention consists in a method of transmitting data in a radio communication system, in a plurality of successive time slots within a transmission frame, in particular a TDMA frame, wherein the power transmitted by a transmitter is modified monotonically between one time slot and the next time slot in the same frame.

BRIEF DESCRIPTION OF THE DRAWINGS

The invention will be better understood after reading the following description and examining the accompanying drawings. The latter are given by way of non-limiting example only. In the drawings:

FIGS. 1a and 1b show the nominal amplitude of the transmitted power for a base station or a mobile telephone of the prior art and in accordance with the invention, respectively, for two successive time slots in the same frame;

FIG. 2 shows the means necessary to effect a calibrated rise in power in a way that generates the least noise; and FIG. 3 shows a preferred calibrated rise in power curve.

MORE DETAILED DESCRIPTION

FIGS. 1a and 1b show, respectively for the prior art and for the invention, the nominal power differences that can be imposed in successive time slots if the same base station or the same mobile telephone requires to continue to transmit from one slot to the other. In FIGS. 1a (i.e. in the prior art), the nominal transmitted power is limited to "A" during a first time slot. This value results from communication between the base station and the mobile telephone. During this communication the base station sets a nominal power for the mobile telephone at which it must transmit for its message to be received correctly. Or vice versa. For the channel concerned, the base station and the mobile telephone are therefore restricted to an assigned power A. The assigned power can be different for the base station and for the mobile telephone. What is important is that there is an assigned power. The time slot with amplitude A begins with a rise in power 1 and ends with a fall in power 2. The next time slot, with nominal amplitude B, begins with a rise in power 3 and ends with a fall in power 4.

In accordance with the invention (see FIG. 1b), the components are the same but the fall in power 2 and the rise in power 3 are replaced by a monotonic variation 5 whereby the nominal transmitted power changes directly from level A to level B. FIGS. 1a and 1b refer to a preferred case in which the amplitude B is greater than the amplitude A in the next time slot. However, there is nothing to prevent the amplitude being lower in the next time slot. In this case, the fall in power would also be monotonic in the sense that it would not fall to zero and then rise, like the fall in power 2 and the rise in power 3.

The reasons why the invention causes less noise than the prior art are as follows. On the one hand, the variation 5 is less than the absolute sum of the variations 2 and 3. Consequently, the invention produces less high frequency interference (harmonics) than the prior art. Moreover, at the time t of changing from one time slot to the next, the power transmitted by the mobile telephone or the base station is still A, and changes to B, whereas in the prior art the transmission amplitude is zero. This is not a problem, however. If the next channel uses the same frequency as the preceding channel in the next time slot, it is no longer possible to consider that there would be interference. In this case, this would be self-interference, the carrier frequency being reserved for the call in progress. From this point of view, it is therefore no problem if the signals continue to be transmitted at the same frequency at the start of the period with amplitude B, precisely because that frequency is assigned to the channel.

In a prior art transmission protocol, the period between two successive time slots, corresponding to the fall in power 2 and the rise in power 3, are not normally used to transmit significant bits. In this intermediate period, a power signal is normally modulated by bits which are meaningless because they are normally not received directly, because of the power signal passing through zero. With the invention, and provided that the existing protocols are modified, it is possible to use this intermediate period to send meaningful bits of data to be transmitted by modulating the transmitted signal accordingly. In this case, the bit rate of the information transmitted can be further increased.

FIG. 2 is a block diagram of the means used to assign a nominal transmitted power to a transmitter in a time slot. FIG. 3 shows the calibrated curve that the gain of a power amplifier must follow at the time of a rise in power 1 or 3 to cause the least possible interference. FIG. 3 shows that at the start of a time slot, during the rise in power, the gain is increased to successively higher values in a number of steps (here sixteen steps) to reach the nominal value A or B. The shape of the curve 3 is known in itself; the curve is a cosine curve, for example.

The principle of such assignment, which is known in itself, is as follows. An amplifier 6 receives the signal to be transmitted at an input 7 and passes it from its output 8 to a radio broadcast aerial 9. A sensor 10 at the output 8 connected to a detector 11 produces at an output 12 of the detector 11 a signal representative of the effective amplitude of the signal transmitted by the antenna 9. The signal available at the output 12 is fed to a first input of a comparator 13 which receives a set point signal at a second input. The set point signal is produced by a reader 14 for reading a set point memory 15. The set point memory 15 therefore contains a plurality of records, here sixteen records, the number of records being equal to the number of periods into which the rise in transmitted power is divided in the manner shown in FIG. 3. The values read in these records correspond to the levels to be complied with in the FIG. 3 curve.

In one example, the memory 15 is a digital memory and when it is read by the reader 14 the contents of its memory cells are passed to a digital-to-analog converter 16 connected to a low-pass filter 17. The output of the low-pass filter 17 is connected to the second input of the comparator 13. FIG. 3 shows symbolically how, over sixteen steps t1 through t16, each step ti corresponds to a quantified level that can be imposed for the amplitude A (or B) and a smoothed level (shown in dashed line) produced by the filter 17.

This approach constitutes prior art and reading of the memory 15 by the reader 14 is sequenced by a microprocessor 18 connected to the various units by a control bus 19. For the rise in power 1 the memory 15 is read in one direction, for example, and for the fall in power 2 the same memory is read in the opposite direction. The program executed by the microprocessor 18 is stored in a memory 20. The object of the program 21 is to multiply by a value A (assigned to the call between the mobile telephone and the base station) standardized values corresponding to the FIG. 3 curve. In program 21, for example, the multiplication that corresponds to the first time slot of FIG. 1a is symbolically represented by an instruction A. Also shown in the form of an instruction B is the assignment of power that corresponds to the second time slot from FIG. 1a. In both cases the memory 15 is read one way and then the other.

In accordance with the invention, the program 21 is modified to include a further instruction (B−A)+A. This means that during the next period the standardized coefficients relating to FIG. 3 are multiplied by B−A (instead of by A or B) and the value A from the preceding slot is added to the result of the multiplication. This produces the monotonic rise 5 (or a fall if B is less than A).

Of course, it is possible to generalize this approach by providing three successive time slots instead of two, or even eight successive time slots, in the same frame, or even in a plurality of successive frames. On each change of time slot, the third instruction is executed to impose a monotonic variation 5 as a function of the power in the preceding time slot and the power in the next time slot.

This mode of operation can give rise to difficulties, however, in particular with loading the memory 15 with values to be imposed during a rise in power, a transition time and a fall in power. In the prior art, the values of A and B change little, with the result that the memory 15 is loaded once and for all, or at least for a relatively long period.

To simplify the explanation, the adjustment values are transmitted via the bus 19 and this transmission, which must be at a very high speed, itself generates noise. To avoid this difficulty, the invention provides for the memory 15 to be associated with a cache 22 loaded slowly with the coefficients of the cells of the memory 15 usable in a rise in power 1, a transition time 5 or a subsequent fall in power 4. At the start of a rise in power, a transition time or a fall in power, the memory 15 is loaded instantaneously with the content of the cache 22, which was loaded slowly. This loading is symbolized by a battery 23 of switches connecting the cells of the memory 15 to corresponding cells of the cache 22. The switches are controlled by an instruction issued by the microprocessor 18 via the bus 19. The instantaneous loading of the memory 15 from the cache 22 does not generate noise because the cache 22 is connected to the memory 15 inside the integrated circuit comprising the components shown in FIG. 2, and not by an external bus 19. The cache 22 can be loaded slowly in the sense that half of the frame can be used to load the cache 22 with the coefficients for the rise in power 1. At the end of this half of the frame, the memory 15 is loaded all at once by operating the switches. During the other half of the frame, the cache 22 is loaded with the coefficients for the transition time 5. The coefficients for the fall in power 4 can be loaded into the cache 22 during both time slots.

This approach reduces the radio frequency noise emitted by the antenna 9 and enhances the quality of the payload bits transmitted. This is why the invention is particularly suitable for high bit rates. The above solution can of course be applied either to the mobile telephones or to the base stations.

What is claimed is:

1. A method of transmitting data in a radio communication system in a plurality of successive time slots (A, B) in the same transmission frame, wherein the transmitted power of a transmitter is modified monotonically between one time slot and the next time slot in the same frame, wherein the modification includes multiplications (coefficient*(B−A)+A) of standardized values by the power differences between the two successive time slots and adding the power of the preceding slot to the results of those multiplications.

2. A method according to claim 1, wherein the modification is a monotonic increasing modification.

3. A method according to claim 1, wherein the modification includes reading a power set-up memory by means of a reader and slaving the transmitted power to the value read in that set-up memory.

4. A method according to claim 3, wherein the modification includes loading a cache by means of a microprocessor during a time slot and transferring the content of the cache into the set-up memory before reading the set-up memory.

5. A method according to claim 1, wherein a transmit signal is modulated by meaningful bits of data to be transmitted during monotonic modification of the transmitted power.

6. A method according to claim 1, wherein the modification is of the cosine type.

* * * * *